US012587505B2

(12) United States Patent
Raghavan et al.

(10) Patent No.: US 12,587,505 B2
(45) Date of Patent: Mar. 24, 2026

(54) SECURE AND PRIVATE NETWORK COMMUNICATIONS

(71) Applicants: Barath Raghavan, Irvine, CA (US);
Paul Schmitt, Honolulu, HI (US)

(72) Inventors: Barath Raghavan, Irvine, CA (US);
Paul Schmitt, Honolulu, HI (US)

(73) Assignees: Barath Raghavan, Irvine, CA (US);
Paul Schmitt, San Luis Obispo, CA
(US)

( * ) Notice: Subject to any disclaimer, the term of this
patent is extended or adjusted under 35
U.S.C. 154(b) by 276 days.

(21) Appl. No.: 18/470,141

(22) Filed: Sep. 19, 2023

(65) Prior Publication Data

US 2024/0106801 A1      Mar. 28, 2024

Related U.S. Application Data

(60) Provisional application No. 63/376,678, filed on Sep.
22, 2022.

(51) Int. Cl.
H04L 9/40 (2022.01)
H04L 67/563 (2022.01)
(52) U.S. Cl.
CPC ...... H04L 63/0281 (2013.01); H04L 63/0421
(2013.01); H04L 67/563 (2022.05)
(58) Field of Classification Search
CPC ............. H04L 63/0281; H04L 63/0421; H04L
67/563; H04L 63/0884
See application file for complete search history.

(56) References Cited

U.S. PATENT DOCUMENTS

| | | | | | |
|---|---|---|---|---|---|
| 8,504,723 | B2 * | 8/2013 | Kohli | ................... | H04L 67/564 |
| | | | | | 709/229 |
| 10,116,761 | B2 * | 10/2018 | Prasad | .................... | H04W 4/06 |
| 2015/0215287 | A1 * | 7/2015 | Cottrell | .................. | H04L 63/08 |
| | | | | | 726/12 |
| 2024/0137853 | A1 * | 4/2024 | Kanugovi | ............. | H04L 67/563 |

OTHER PUBLICATIONS

INVISV. (Sep. 15, 2022) "INVISV Relay: Technical Details,"
located at https://invisv.com/relay/relay_details. (4 pages).
INVISV. (Sep. 15, 2022) "Why VPNs are Wrong and MPRs are
Right," located at https://invisv.com/articles/relay.html. (8 pages).

* cited by examiner

*Primary Examiner* — Amie C. Lin
(74) *Attorney, Agent, or Firm* — Morrison & Foerster
LLP

(57) ABSTRACT

A network communication system comprising a client
device, a pre-proxy server, a forward proxy server, a desti-
nation server, and a nameserver is provided. The nameserver
is configured such that when the client device requests a
network address of the destination server, the nameserver
instead provides a network address of the pre-proxy server.
The client device then relies on the provided network
address to send traffic to the pre-proxy server that appears,
to the client, to be directed to the destination server. The
pre-proxy server optionally processes the received data and
causes the data to be forwarded to the destination server via
a multi-party relay (MPR) pathway. Secure and anonymized
access for the client device to the destination server via an
MPR pathway is thereby provided without requiring the
client device to rely on specialized hardware or software.

14 Claims, 6 Drawing Sheets

100

200

<u>300</u>

SECURE AND PRIVATE NETWORK COMMUNICATIONS

CROSS-REFERENCE TO RELATED APPLICATIONS

This application claims the benefit of U.S. Provisional Application No. 63/376,678, filed Sep. 22, 2022, the entire contents of which is incorporated herein by reference.

FIELD

The present disclosure relates generally to systems and methods for providing data security and privacy, and more specifically to systems and methods for providing network communications including multi-party relay systems without the need for specialized configuration of a client.

BACKGROUND

The internet is perhaps the largest and most essential system humanity has ever built, but privacy and security were not designed into the architecture and communication protocols of the internet from the start. The basic mechanisms by which traffic is routed via the internet cause network identifiers of internet user—e.g., IP addresses—to be visible to the network. Moreover, because network communication relies on multiple parties (multiple network nodes) to carry traffic, other parties are able to see the traffic content and network identifiers of others. Thus, the basic architecture of the internet is one that does not ensure data privacy, metadata privacy, or user anonymity.

SUMMARY

As described above, the basic architecture of the internet does not inherently provide data privacy, metadata privacy, or user anonymity.

One approach to preserving data privacy is to leverage end-to-end encryption. However, use of data encryption does not address the problem of user privacy/anonymity. That is to say, even if the content of data itself is protected while in transit, the IP address of the sending party and the receiving party may still be readily visible on the network. Other parties may therefore still easily gain knowledge as to which parties are in communication with one another.

In order to attempt to preserve user privacy/anonymity, Virtual Private Networks (VPNs) may be used. In a network communication architecture leveraging a VPN, the VPN acts as an intermediary between the sending party and the receiving party. Rather than routing data directly from the sending party to the receiving party, it is instead routed from the sending party first to the VPN, and then from the VPN to the receiving party. Thus, while IP address of the sending party may be visible to the VPN itself, the VPN may remove that identifying information from the payload before forwarding the payload to the receiving party. In this manner, all parties upstream of the VPN will see only that the sending party is sending (encrypted) data to the VPN, and all parties downstream will see only that the VPN is sending (encrypted) data to the receiving party. Because the VPN is likely to receive data from many thousands of users and route data to many thousands of destinations, correlating the traffic arriving at the VPN with the traffic leaving the VPN may be impractical or impossible, and the fact that a certain pair of sending and receiving parties are in communication with one another may be knowable only by the VPN.

However, VPN arrangements have several shortcomings. First and foremost, a VPN arrangement does not protect user anonymity and metadata privacy from the party controlling the VPN itself. That is, while the fact that a certain pair of sending and receiving parties are in communication with one another may be shielded from other parties, using a VPN arrangement inherently requires that this information is surrendered to the party controlling the VPN itself. VPNs have no architectural protection separating a user's identity from a user's traffic. Furthermore, almost all VPNs operate at a packet level, meaning that packet level correlations, depending upon the protocol, are possible as the raw packets from a user go end-to-end via the VPN to the destination server. Thus, using VPN arrangements may require a user to place absolute faith and trust in the party operating the VPN, while the user is not provided any structural or architectural reassurances against an inadvertent or intentional data breach by the VPN.

Another approach to protecting user identity and preserving the anonymity of internet communications is to leverage a multi-party relay (MPR) system. In a multi-party relay arrangement, multiple intermediate "hops" are used between the sending party and the receiving party. For example, the sending party first sends data to a first proxy server controlled by a first organization, where the data sent to the first proxy server includes an encrypted indication of the ultimate receiving party. The first intermediary controlling the first proxy server can thus see the identity of the sending party, but cannot see the identity of the ultimate receiving party, which is encrypted. The first intermediary then removes the sending party's identifying information and forwards the transmission content and the encrypted destination information to a second proxy server controlled by a second intermediary. The second intermediary can then decrypt the indication of the ultimate receiving party (using a decryption key that is not accessible to the first intermediary) and can forward the message content to the ultimate receiving party.

In an MPR arrangement, neither of the intermediary parties has visibility into both the sender and the recipient of the data. The initial intermediary has visibility as to the identity of the sending party, but it cannot see the encrypted receiving party and knows only that the data should be forwarded to the second intermediary. The second intermediary, meanwhile, can decrypt the identity of the receiving party and therefore has visibility into the identity of the receiving party, but it does not know the identity of the sending party, which has never been sent to it by the initial intermediary. More succinctly, the first intermediary only knows the sender, while the second intermediary only knows the recipient, neither intermediary knows both the sender and recipient and neither intermediary can see the encrypted data content itself. Additionally, in this manner, MPRs may be used to protect data content, metadata content, and user anonymity.

However, MPR systems such as those described above may have various drawbacks. First, such MPR systems may require that the initial sending party have specialized software and/or hardware installed on the end-user device or end-user system in order to cause traffic to be routed through the MPR pathway rather than directly to an intended destination. While large organizations with sophisticated data-security practices may leverage MPR arrangements by ensuring that all outbound traffic from their networks is routed through an MPR pathway, enterprise-level solutions may be difficult, impractical, and/or expensive to install on all devices for all members of an organization. Furthermore, use of MPR arrangements by ordinary users for their personal devices is too complex for most ordinary users, due to the need for specialized on-device hardware and/or software. Thus, there is a need for MPR network communication systems that can route network traffic through MPR pathways without requiring specialized software and/or hardware installed on the end-user device or end-user system. More generally, there is a need for network communications systems that allow clients without special configuration (e.g., unmodified clients) to communicate with servers without special configuration (e.g., unmodified servers) without the server gaining access to information as to the identity of the client.

Additionally, such MPR systems may fail to protect user anonymity in situations in which a user is required to prove that they are authorized to connect to a destination server. For example, in these situations, a user may be required to provide their identity in order to prove that they are authorized, thereby exposing their identity to the destination server. Accordingly, there is a need for MPR network communication systems that can allow users to authenticate themselves to servers via an MPR pathway without exposing their identity to any of the MPR intermediaries or to the server to which the user is being authenticated.

Disclosed herein are systems and methods that may address one or more of the above-identified needs.

An MPR system may be configured to allow communication between a client and server without requiring special hardware or software configuration on the client device or a client system. Communication between the client and the server may be facilitated by a first intermediary party controlling a pre-proxy server and a second intermediary party controlling a forward proxy. However, rather than requiring the client to manually direct its communication to the pre-proxy, or to specially configure the client or a client system to send its communication to the pre-proxy, the MPR system may be configured such that the client is automatically redirected to the MPR pathway when the client attempts to directly reach the destination server. For example, a domain name system (DNS) protocol may be used to automatically reroute incoming traffic for a web site, such that all internet users attempting to reach the web site's server directly will be automatically rerouted through an MPR pathway. This may be achieved by configuring a nameserver associated with the website to—rather than directing users accessing the website's URL to the website's server itself—instead direct users to a pre-proxy of an MPR pathway such that the incoming traffic can be directed through, protected by, and anonymized via the MPR pathway. In this manner, DNS may be used to configure an entire website such that all incoming traffic is directed through an MPR pathway, enforcing privacy and anonymity on all incoming users, rather than requiring each individual user to configure their own devices or systems with specialized MPR hardware/software.

Additionally, an MPR system may be configured to allow communication between a client and a destination server in such a way that the client may be authenticated to the server without revealing identifying information of the client to the server. In some embodiments, an MPR system may leverage one or more oblivious authentication techniques and/or oblivious authorization techniques. For example, an MPR system may be configured to use blind signatures such that a client can authenticate itself to the server, via an MPR pathway, without revealing its identity. This may allow for the system to provide access control while not sacrificing the privacy benefits of the MPR architecture.

In some embodiments, pre-proxy server configured to facilitate communication between clients and a server may be provided, wherein the pre-proxy comprises one or more processors and memory storing instructions that, when executed by the one or more processors, cause the pre-proxy server to: receive, from a client device, a first transmission comprising a request to access a service hosted at a destination server, wherein the first transmission comprises data intended for the destination server and identity information identifying the client device; and in response to receiving the first transmission, generate and transmit a second transmission to a forward proxy server, wherein the second transmission comprises the data intended for the destination server and comprises instructions for forwarding the data to the destination server, and wherein the second transmission does not include the identity information identifying the client device.

In some embodiments of the pre-proxy server, wherein the first transmission is sent via a first network protocol and the second transmission is sent via a second network protocol.

In some embodiments of the pre-proxy server, the second network protocol is IETF MASQUE. In some embodiments of the pre-proxy server, the instructions cause the pre-proxy server to encrypt the data intended for the destination server before transmitting it to the forward proxy server.

In some embodiments of the pre-proxy server, the request to access the service hosted at the destination server is transmitted, from the client device to the pre-proxy server, in response to the client device requesting a network address of the destination server from a nameserver and receiving instead from the nameserver a network address of the pre-proxy server.

In some embodiments of the pre-proxy server, the client device received the network address of the pre-proxy server from the nameserver via a DNS protocol.

In some embodiments of the pre-proxy server, the client device received the network address of the pre-proxy server from the nameserver via an oblivious protocol.

In some embodiments of the pre-proxy server, the instructions cause the pre-proxy server to communicate via the forward proxy server with the destination server using an oblivious protocol to provide one or both of oblivious authentication and oblivious authorization for the client.

In some embodiments of the pre-proxy server, the service hosted at the destination server comprises a real-time communication service, and wherein the pre-proxy server provides anonymous access for the client to access the real-time communication service at the destination server.

In some embodiments of the pre-proxy server, the pre-proxy server and the forward-proxy server are controlled by different entities.

In some embodiments of the pre-proxy server, the pre-proxy server and the destination server are controlled by different entities.

In some embodiments of the pre-proxy server: the pre-proxy server and the destination server are controlled by the same entity; and the pre-proxy server and the destination server is separated from one another using a trusted execution environment.

In some embodiments, a first non-transitory computer readable storage medium may be provided, the first non-transitory computer readable storage medium storing instructions that, when executed by one or more processors of a pre-proxy server, cause the pre-proxy server to: receive, from a client device, a first transmission comprising a request to access a service hosted at a destination server, wherein the first transmission comprises data intended for the destination server and identity information identifying the client device; and in response to receiving the first transmission, generate and transmit a second transmission to a forward proxy server, wherein the second transmission comprises the data intended for the destination server and comprises instructions for forwarding the data to the destination server, and wherein the second transmission does not include the identity information identifying the client device.

In some embodiments, a first method may be provided, wherein the first method is performed by one or more processors of a pre-proxy server, the first method comprising: receiving, from a client device, a first transmission comprising a request to access a service hosted at a destination server, wherein the first transmission comprises data intended for the destination server and identity information identifying the client device; and in response to receiving the first transmission, generating and transmitting a second transmission to a forward proxy server, wherein the second transmission comprises the data intended for the destination server and comprises instructions for forwarding the data to the destination server, and wherein the second transmission does not include the identity information identifying the client device.

In some embodiments, a network communication system is provided, the network communication system comprising a client device, a pre-proxy server, a forward proxy server, a destination server, a nameserver, and a non-transitory computer-readable storage medium storing instructions that, when executed by one or more processors of the system, cause the system to: transmit, from the client device to the nameserver, a request for a network address of the destination server; transmit, from the nameserver to the client device, in response to the request for a network address of the destination server, a network address of the pre-proxy server, wherein the network address of the pre-proxy server is different from the network address of the destination server; transmit, from the client device to the pre-proxy server, a transmission comprising data intended for the destination server; transmit, from the pre-proxy server to the forward proxy server, a first transmission comprising the data intended for the destination server; and transmit, from the forward proxy server to the destination server, a second transmission comprising the data intended for the destination server.

In some embodiments, a second non-transitory computer-readable storage medium may be provided, the second non-transitory computer readable storage medium storing instructions that, when executed by one or more processors of a network communication system comprising a client device, a pre-proxy server, a forward proxy server, a destination server, and a nameserver, cause the system to: transmit, from the client device to the nameserver, a request for a network address of the destination server; transmit, from the nameserver to the client device, in response to the request for a network address of the destination server, a network address of the pre-proxy server, wherein the network address of the pre-proxy server is different from the network address of the destination server; transmit, from the client device to the pre-proxy server, a transmission comprising data intended for the destination server; transmit, from the pre-proxy server to the forward proxy server, a first transmission comprising the data intended for the destination server; and transmit, from the forward proxy server to the destination server, a second transmission comprising the data intended for the destination server.

In some embodiments, a second method may be provided, the second method performed by one or more processors of a network communication system comprising a client device, a pre-proxy server, a forward proxy server, a destination server, and a nameserver, the second method comprising: transmitting, from the client device to the nameserver, a request for a network address of the destination server; transmitting, from the nameserver to the client device, in response to the request for a network address of the destination server, a network address of the pre-proxy server, wherein the network address of the pre-proxy server is different from the network address of the destination server; transmitting, from the client device to the pre-proxy server, a transmission comprising data intended for the destination server; transmitting, from the pre-proxy server to the forward proxy server, a first transmission comprising the data intended for the destination server; and transmitting, from the forward proxy server to the destination server, a second transmission comprising the data intended for the destination server.

In some embodiments, any of the features of any of the embodiments described above and/or described elsewhere herein may be combined, in whole or in part, with one another.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Various aspects of the disclosed methods and systems are set forth with particularity in the appended claims. A better understanding of the features and advantages of the disclosed methods and systems will be obtained by reference to the following detailed description of illustrative embodiments and the accompanying drawings, of which:

DETAILED DESCRIPTION

Described herein are systems and methods for secure and private network communications.

Figure 1:
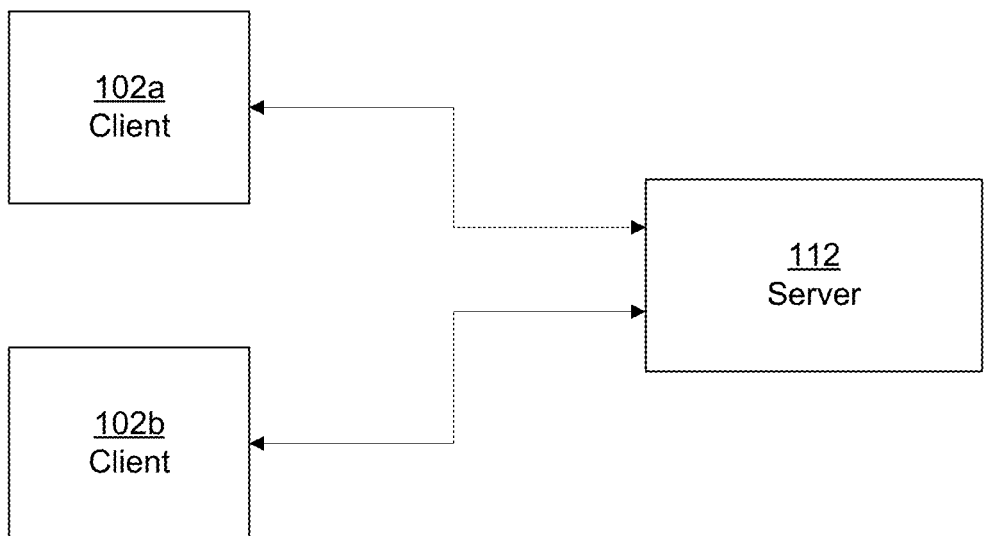
FIG. 1 depicts a network system in which clients communicate with a server device, in accordance with some embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are accorded the scope consistent with the claims FIG. 1 depicts a network system 100 in which clients communicate with a server device, in accordance with some embodiments. Network system 100 may comprise all or part of any public or private network system, including the internet. As shown in FIG. 1, network system 100 may include clients 102a and 102b, each of which may be any suitable device enabled for network communication by any one or more wired and/or wireless network communication protocols. Network system 100 may further include server 112, which may be any suitable server enabled for network communication by any one or more wired and/or wireless network communication protocols. Clients 102a and 102b and server 112 may be configured such that clients 102a and 102b may communicate via network system 100 with server 112. In some embodiments, when client 102a or client 102b communicates with server 112, identifying information such as an IP address for the client may be exposed to server 112 and/or to intermediary network devices that help to route the traffic from the client to server 112.

Figure 2:
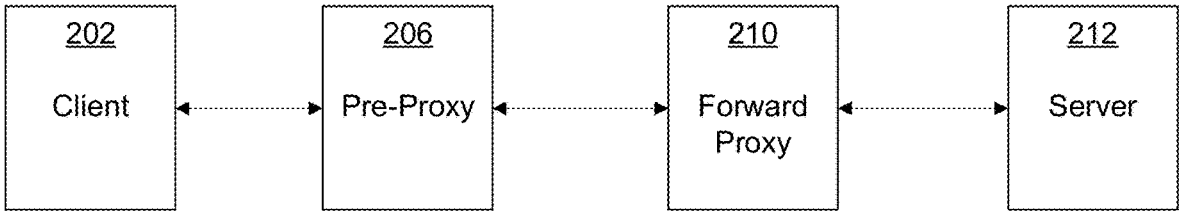
FIG. 2 depicts a multi-party relay (MPR) system in which a client communicates with a server via a pre-proxy and a forward proxy, in accordance with some embodiments.

FIG. 2 depicts a multi-party relay (MPR) system 200 in which a client communicates with a server via a pre-proxy and a forward proxy, in accordance with some embodiments. MPR system 200 may be a part of any network system, which may share any one or more characteristics in common with network system 100. As shown in FIG. 2, MPR system 200 may include client 202 and server 212, which may share any one or more characteristics in common with the corresponding components (clients 102 and server 112, respectively) in system 100. MPR system 200 may differ from network system 100 in that, rather than communicating "directly" with one another—e.g., via standard network communications protocols that do not provide data privacy, metadata privacy, and/or user anonymity—client 202 and server 212 may instead communicate with one another via an MPR pathway that leverages pre-proxy 206 and forward proxy 210. Pre-proxy 206 and forward proxy 210 may each comprise one or more devices and/or servers configured to receive, process, and forward network traffic to facilitate communication between client 202 and server 212. (Pre-proxy 206 may alternatively be referred to as a "first proxy" or as "Proxy A"; forward proxy 210 may alternatively be referred to as a "second proxy" or as "Proxy B.")

In some embodiments, a pathway for MPR communication may be provided in which client 202 may send traffic to pre-proxy 206, pre-proxy 206 may send traffic to forward proxy 210, and forward proxy 210 may send traffic to server 212. Initial traffic sent from client 202 to pre-proxy 206 may include an encrypted indication of the final destination address (e.g., an encrypted version of the IP address of server 212). When pre-proxy 206 receives the initial traffic, pre-proxy 206 may be able to see the IP address of device 202 (and therefore determine the identity of device 202), but pre-proxy 206 may be unable to decrypt the final destination address, so it may not be able to determine the final destination for the traffic (e.g., server 212). Pre-proxy 206 may then forward the encrypted traffic, including the encrypted indication of the final destination address, to forward proxy 210; however, pre-proxy 206 may remove the IP address and/or other identifying information for device 202 before forwarding the traffic to forward proxy 210. Thus, when the traffic is received at forward proxy 210, forward proxy 210 may only be able to determine that the traffic came from pre-proxy 206, and may not be able to determine that the traffic originally came from device 202. Forward proxy 210 may then decrypt the encrypted indication of the final destination address, thereby extracting the address (e.g., IP address) of server 212, and may forward the traffic to server 212. When server 212 receives the traffic from forward proxy 210, server 212 may only be able to determine that the traffic came from pre-proxy 206, and may not be able to determine that the traffic originally came from client 202. In this manner, MPR system 200 may provide data security, metadata security, and/or anonymity for communications between client 202 and server 212.

In some embodiments, MPR system 200 may be configured to allow communication between client 202 and server 212 such that client 202 may be authenticated to server 212 without revealing identifying information of client 202 to server 212. In some embodiments, MPR system 200 may leverage one or more oblivious authentication techniques and/or one or more oblivious authorization techniques. For example, MPR system 200 may be configured to use blind signatures such that client 202 can authenticate itself to server 212, via pre-proxy 206 and forward proxy 210, without revealing its identity. MPR system 200 may be configured to provide oblivious authentication and/or authorization that takes place "over the top"—that is, the oblivious authentication and/or authorization uses the secure/metadata-private channel that MPR system 200 established as a means of communicating to the destination service (e.g., server 212) without revealing the identity of client 202—and may perform an oblivious protocol. This may allow for system 200 to provide access control while not sacrificing the privacy benefits of the MPR architecture.

Figure 3:
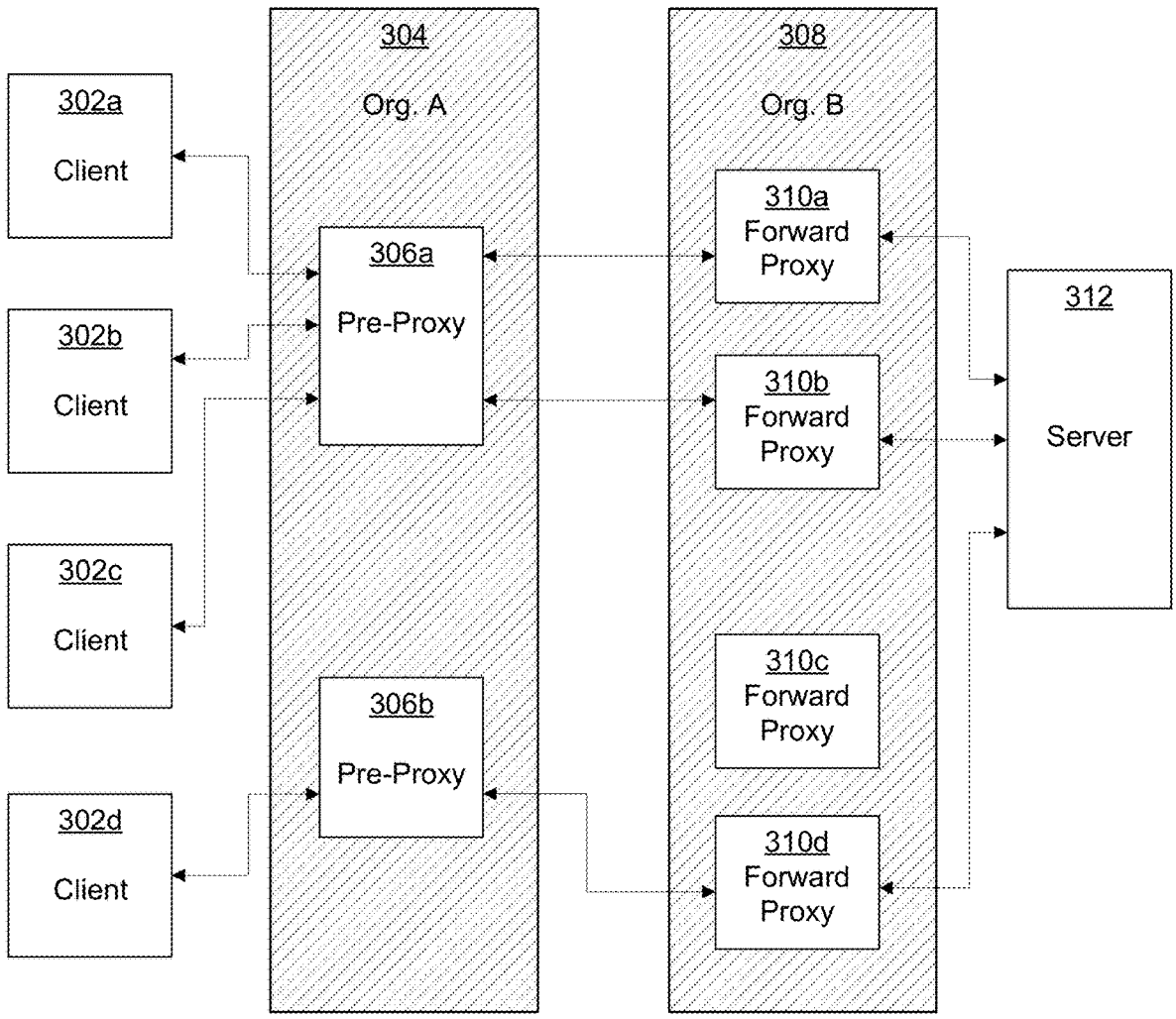
FIG. 3 depicts an MPR system in which multiple clients communicate with multiple servers via a plurality of pre-proxies controlled by a first organization and a plurality of forward proxies controlled by a second organization, in accordance with some embodiments.

FIG. 3 depicts an MPR system in which multiple clients communicate with multiple servers via a plurality of pre-proxies controlled by a first organization and a plurality of forward proxies controlled by a second organization, in accordance with some embodiments.

MPR system 300 may share any one or more characteristics in common with MPR system 200 and its components (e.g., clients 302a-d, pre-proxies 204a-b, forward proxies 308a-d, and server 312) may share any one or more characteristics in common with corresponding components in system 200. The depiction of MPR system 300 specifically demonstrates that, in some embodiments, a first organization 304 may control one or more pre-proxies 304a and 304b, whereas a second organization 308 (distinct from the first organization) may control one or more forward proxies 308a-d. As used with respect to FIG. 3, the term "organization" may refer to any company, non-profit organization, person, group of persons, or the like. While FIG. 3 illustrates an embodiment in which two pre-proxies and four forward proxies are shown, any suitable number of pre-proxies and any suitable number of forward proxies may be used.

FIG. 3 demonstrates how, by vesting control of pre-proxies for an MPR system with one organization and vesting control of forward proxies for the MPR system with another organization, users of MPR system 300 may be further assured that information will not be shared between the pre-proxies and the forward proxies in a manner that would compromise metadata security and/or user anonymity. For example, because the first organization 304 and the second organization 308 are separate from one another, users may be assured that only the first organization 304 (and not the second organization 308) will be aware of the IP addresses of clients 302*a-d* and that only the second organization 308 (and not the second organization 304) will be aware of the IP addresses of traffic bound for server 312.

FIG. 3 further demonstrates how, when a single organization runs multiple pre-proxies for an MPR system and another single organization runs multiple forward proxies for the MPR system, traffic may be routed variously to and from the multiple proxies and pre-proxies in the system. In some embodiments, the number of pre-proxies and forward-proxies may be selected and/or adjusted according to traffic demands, load constraints, geographic considerations, and the like.

In some embodiments, an MPR system such as system 300 may be configured such that the same organization controls the pre-proxy and the destination server. In such embodiments, using forward proxies run by a different organization may ensure that privacy and anonymity is maintained by inserting a different organization between the pre-proxy and server. Alternatively, in such embodiments, the destination server and/or a destination service may be run in a TEE and/or secure enclave to provide security/anonymity. A TEE and/or secure enclave may be used to encrypt memory and processing using special hardware such that even the party that is running the enclave does not have visibility into the TEE/enclave while it is running. As a result, a TEE/enclave may allow for a server to function, effectively, as a server run by a separate organization (e.g., the CPU manufacturer, such as Intel or AMD, may be the root of trust in a TEE). As a result, a TEE/enclave may provide similar security/privacy guarantees as having a pre-proxy and destination server run by actually separate organizations.

In some embodiments, an MPR system such as system 300 may be configured such that different organizations control the pre-proxies and the destination server. In such embodiments, it may be possible to provide MPR-type privacy without the need for a forward proxy, by causing a pre-proxy to function as a proxy in front of a destination server and/or service using a TEE and/or a secure enclave. In embodiments using a TEE and/or secure enclave, decoupling of control and visibility between information inside the TEE/enclave versus information outside the TEE/enclave may be effectively provided without the need to involve two separate organizations.

Figure 4:
FIG. 4 depicts an MPR system in which a nameserver is used to redirect traffic from a client through a pre-proxy and a forward-proxy.
Figure 4:
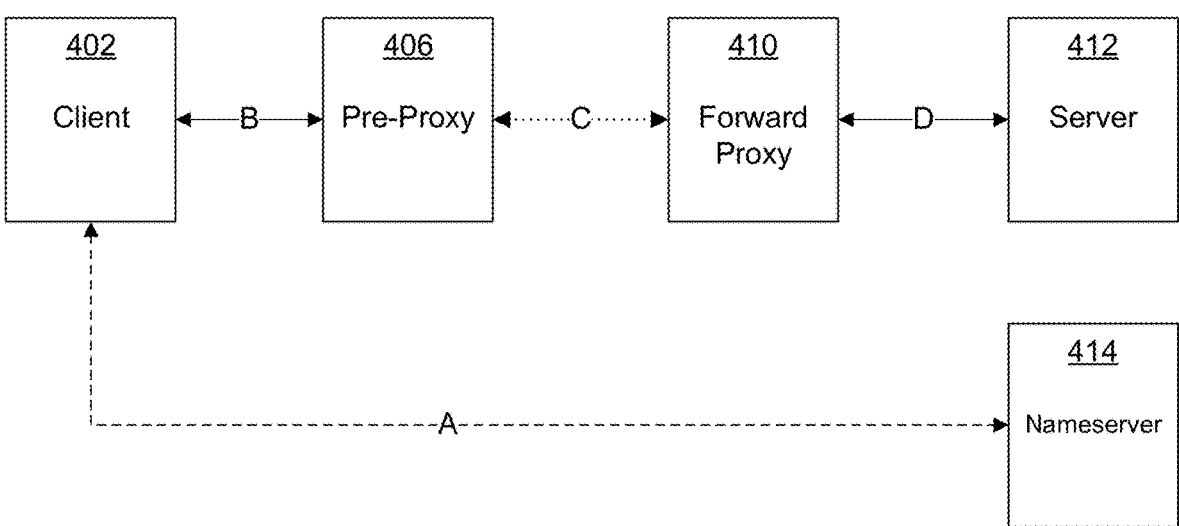

FIG. 4 depicts an MPR system 400 in which a nameserver is used to redirect traffic from a client through a pre-proxy and a forward-proxy, in accordance with some embodiments. As described above, MPR systems may in some embodiments require that end users—e.g., those users in control of clients such as devices 102, 202, and/or 302—specially configure their devices and/or systems to leverage the MPR system. This requirement places a burden on the end user and may make end users less likely to adopt and consistently use MPR-based communications. The arrangement shown in FIG. 4 may address this shortcoming.

As shown in FIG. 4, MPR system 400 may comprise client 402, pre-proxy 406, forward proxy 410, and server 412. MPR system 400 may share any one or more characteristics in common with MPR system 200 and/or MPR system 300, and its components may share any one or more characteristics in common with corresponding components in system 200 and/or in system 300. MPR system 400 further includes nameserver 414, which may be a nameserver associated with server 412.

In a conventional DNS arrangement, a nameserver such as nameserver 414 may be configured such that, when an end-user enters a web address into an internet browser, the user's system sends a request to the nameserver, and the nameserver responsively returns to the user's system the IP address for a server hosting the website associated with the web address the user entered.

In MPR system 400, nameserver 414 may be reconfigured to direct traffic through an MPR communication pathway instead of directing traffic directly to server 412.

First, client 402 may first provide a website name associated with server 412 to nameserver 414. Nameserver 414 may then respond to client 402 by providing—instead of the IP address of server 412—the IP address of pre-proxy 406. In some embodiments, communications between client 402 and nameserver 414 may be carried out using DNS communications protocols. In some embodiments, additional privacy may be afforded if communications between client 402 and nameserver 414 are carried out using Oblivious DNS and/or Oblivious DNS over HTTPS. Using one or more of these protocols, rather than client 402 sending DNS queries via a recursive resolver only, a second hop may be used for communication with nameserver 414.

After receiving the IP address for pre-proxy 406, client 402 may then direct its traffic to pre-proxy 406 instead of directing it directly to server 412. This communication may be made in accordance with the original network protocol that client 402 would otherwise have used to address traffic directly to server 412. The traffic may be directed in this manner even if a user of client 402 intended to or believed that he or she was directing traffic directly to server 412. In this way, use of an MPR communication pathway may be enforced by server 412 at the DNS nameserver level, causing any incoming traffic to server 412 that uses nameserver 414 to be automatically redirected through the MPR communication pathway without requiring that end users have any specialized software or hardware configured for using an MPR system.

In some embodiments, pre-proxy 406 may be a dedicated pre-proxy server that is associated with server 412, such that all incoming traffic to pre-proxy 406 is assumed to be intended for server 412. Pre-proxy 406 may accordingly be configured to cause all incoming traffic to be forwarded, via forward proxy 410, to server 412.

After the traffic is sent from client 402 to pre-proxy 406, the traffic may be forwarded from pre-proxy 404 to forward proxy 410, for example using a protocol such as IETF MASQUE or any other protocol enabling forward proxy behavior by instructing a server by a client to make a connection to a destination. In some embodiments, pre-proxy 206 may be configured to remove information indicating the identity of client 402 (e.g., the IP address of client 402) from the traffic before forwarding the traffic to forward proxy 410. In some embodiments, pre-proxy 406 may run a client stack that may be used to encrypt all or part of the traffic received from client 402 before forwarding that traffic to forward-proxy 410, which may account for situations in which client 402 is not itself specially configured to encrypt transmitted data, to encrypt destination IP addresses, or to otherwise use MPR communications pathways. In some embodiments, pre-proxy 406 may function as a reverse proxy plus a client stack that implements the client side of MASQUE or another suitable protocol for instructing a forward proxy to make a connection to a destination.

Finally, the traffic may be forwarded from forward proxy 410 to server 412, for example using the same original network protocol that client 402 would otherwise have used to address traffic directly to server 412.

In the exemplary arrangement explained above, traffic originally intended by client 402 to be sent directly to server 412 may instead be redirected by nameserver 414 through the MPR communication pathway provided by pre-proxy 406 and forward proxy 412. This technique may provide several advantages.

It should be noted that full anonymity of communications between client 402 and server 412 may, in some embodiments, not be provided in such an arrangement, for example because nameserver 414 and pre-proxy 406 may both be able to determine that client 402 and server 412 are in communication with one another. Nonetheless, if it is assumed that server 412 is not in collusion with nameserver 414 nor with pre-proxy 406, then anonymity of client 402 may be preserved with respect to server 412 due to the fact that pre-proxy 406 may remove any identifying information for client 402 before the traffic from client 402 is forwarded to pre-proxy 410 and/or to server 412.

By using an arrangement in which pre-proxy 406 removes identifying information for client 402 before the traffic is forwarded to server 412, system 400 may limit the visibility available to server 412 into the identity of users of a service provided by server 412 who are connecting with one another via the service. For example, in embodiments in which server 412 provides a video chat application, server 412 may be able to see that various different users of the service are connecting with (e.g. chatting with) one another at server 412, but server 412 may be unable to correlate those users to true user identities (e.g., IP addresses), because server 412 will see all traffic as originating from forward proxy 410 (and/or from pre-proxy 406) rather than from a true client. Thus, server 412 will not be able to determine the user identities of users who are chatting (or otherwise connecting with) one another at the server.

While server 412 may be unable to determine true identities of users (e.g., of client 401), pre-proxy 406 may meanwhile be aware of the true identity of client 402 (e.g., by virtue of receiving the IP address of client 402), and may be aware that client 402 is connecting to server 412. However, pre-proxy 406 may not have visibility into any inter-user connections that are made amongst various users (e.g., including users of client 402) at server 412. For example, in embodiments in which 412 provides a video chat application, pre-proxy 406 may be aware that client 402 is connecting to server 412, but it will not be able to determine which other users client 402 connects with at server 412.

While the arrangement for system 400 illustrated in FIG. 4 contemplates inclusion of pre-proxy 406 and forward proxy 410, one or more of the above-described advantages (e.g., preserving user anonymity for clients with respect to server 412, and preventing server 412 or pre-proxy 406 from determining the true identity of users who are connecting with one another via server 412) may be provided in some embodiments without the use of a forward proxy. For example, pre-proxy 406 may remove identifying information (e.g., client IP address) for traffic from client 402 and may forward the traffic directly to server 412, rather than routing it through a forward proxy. Thus, only a single "hop" may be used to transmit traffic from client 402 to server 412. However, so long as pre-proxy 406 faithfully and reliably removes identifying information for the client traffic, the advantages described above may still be provided. In some embodiments, using a "second hop"—e.g., using forward proxy 410 in addition to pre-proxy 406—may provide additional assurances that identifying information for client 402 is in fact being removed from traffic that is forwarded to server 412. Using a "second hop" to provide additional assurances of anonymity may be advantageous in embodiments in which pre-proxy 406 and server 412 are run by the same organization, such that the insertion of forward-proxy 410 between the two can ensure that client identifying information is in fact being removed and is not inadvertently or intentionally being exchanged between pre-proxy 406 and server 412.

Using an arrangement such as the those described with respect to system 400, metadata-private real-time communication and collaboration applications may be provided, such that metadata—e.g., indicating which users are participating in a call, who they are connecting with, and when—may be protected. Real-time communication and collaboration applications may include, for example, videoconferencing applications, voice/VoIP applications, messaging applications, P2P file transfer applications, and whiteboard applications. Real-time collaboration tools (document editing, code, etc.) Metadata-private real-time communication and collaboration applications as enabled by system 400 may offer an improvement over end-to-end encrypted systems in which metadata about participants is visible to the server running the application, and may offer an improvement over metadata-private messaging applications that may have very high latency making them impractical for real-time communication and collaboration applications.

Figure 5:
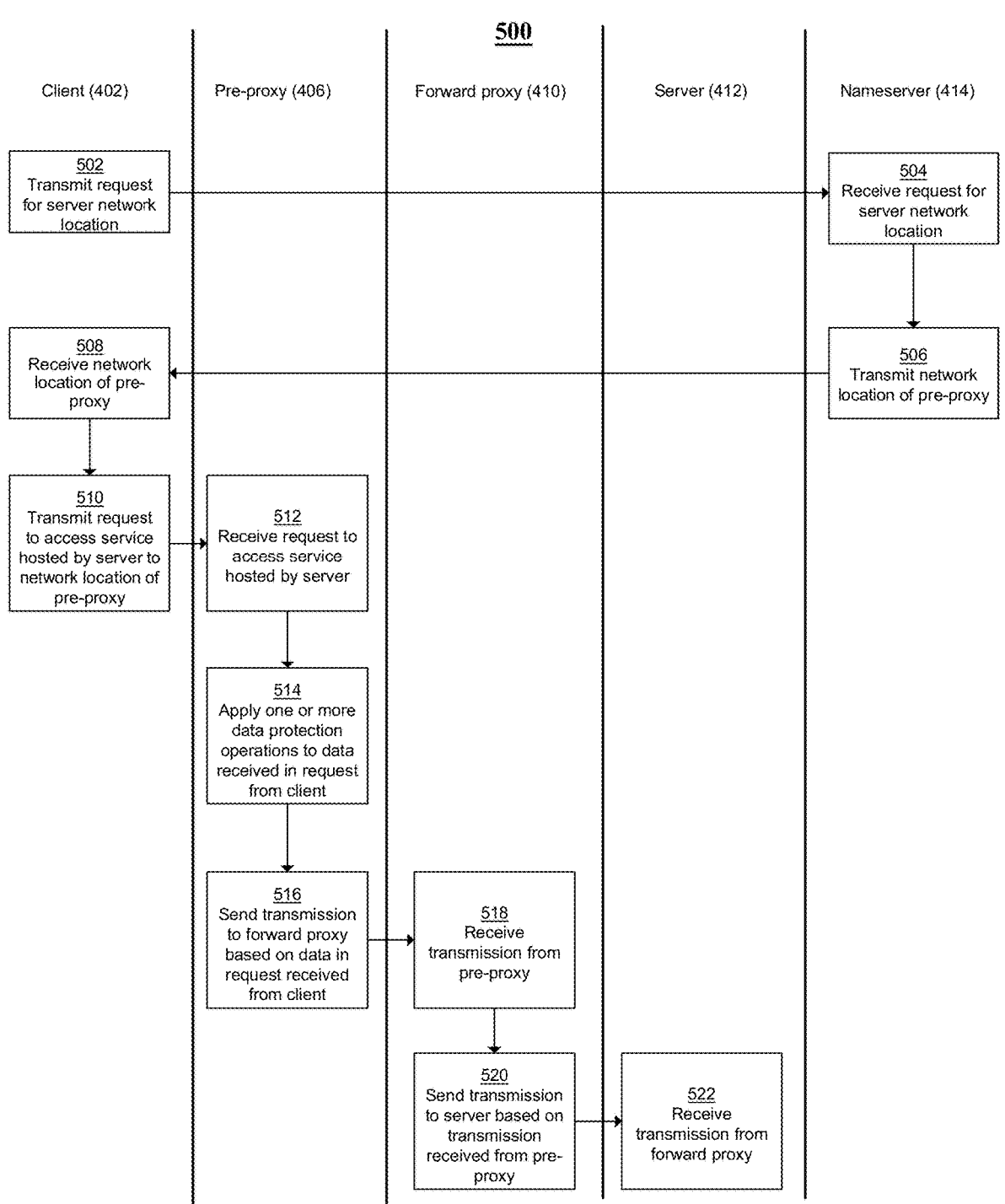
FIG. 5 depicts a method for secure network communications using an MPR system, in accordance with some embodiments.

FIG. 5 depicts a method for secure network communications using an MPR system, in accordance with some embodiments. FIG. 5 may be performed by any suitable MPR system. In the example shown, FIG. 5 is performed by MPR system 400.

At block 502, in some embodiments, client 402 may transmit a request to nameserver 414 for a network location of server 412. The transmission may be made by a DNS protocol, including optionally using an oblivious protocol such as oblivious DNS and/or oblivious DNS over HTTPS.

At block 504, in some embodiments, nameserver 414 may receive the request from client 402 for the network location of server 412.

At block 506, in some embodiments, in response to the request received from client 402 for the network location of server 412, nameserver 508 may transmit the network location of pre-proxy 406 to client 402.

At block 508, in some embodiments, client 402 may receive the network location of pre-proxy 406 from nameserver 414.

At block 510, in some embodiments, based on the received network address for pre-proxy 406, client 402 may transmit a request to access a service hosted by server 412 pre-proxy 406. A user of client 402 may believe that the request is being transmitted directly to server 412, but the destination address for the transmission is instead the network location of pre-proxy 406. The transmission may be made using a network protocol by which client 402 would otherwise have directly requested access from server 412.

At block 512, in some embodiments, pre-proxy 406 may receive the request to access the service hosted by server 412 from client 402.

At block 514, in some embodiments, pre-proxy 406 may apply one or more data processing operations to data included in the request received from client 402. Pre-proxy 406 may anonymize the data, encrypt the data, and/or otherwise process the data. Pre-proxy 406 may use the received data to generate one or more transmission payloads to be forwarded either directly to server 412 or to forward proxy 410 for subsequent transmission to server 412.

At block 516, in some embodiments, pre-proxy 406 may send a transmission to forward proxy 410 based on data in the request received from client 402. The transmission to forward proxy 410 may be anonymized such that it does not include identifying information for client 402. In some embodiments, the transmission may include an instruction to forward data from the transmission to server 412. In some embodiments, the transmission may be made using IETF MASQUE protocol.

At block 518, in some embodiments, forward proxy 410 may receive the transmission from pre-proxy 516.

At block 520, in some embodiments, forward proxy may send a transmission to server 412 based on the transmission received by forward proxy 410 from pre-proxy 406. In some embodiments, forward proxy may send the transmission to server 412 including data that was included in the received transmission and based on instructions provided via the received transmission. In some embodiments, the transmission may be made using the network protocol by which client 402 would otherwise have directly requested access from server 412 (e.g., the same network protocol as the transmission in block 510).

At block 522, in some embodiments, forward proxy 410 may receive the transmission from forward proxy 410. In some embodiments, the transmission may appear to server 412 to have come from an ordinary client rather than a forward proxy server.

Some embodiments disclosed herein contemplate using a nameserver to use DNS protocols to clause traffic from a client device to be routed to a pre-proxy of an MPR pathway. However, other techniques for causing traffic from a client device (including a client device not specialized to use MPR systems) may be used. Any suitable technique for causing network traffic to be routed to a server applying the functionalities disclosed herein with respect to pre-proxy servers may be used. For example, one or more of the functionalities of a pre-proxy server disclosed herein may be implemented on a gateway or other network device through which traffic is routed. So long as a network device implementing the functionalities disclosed herein is positioned somewhere in the network path, one or more of the advantages described herein may be able to be provided.

Figure 6:
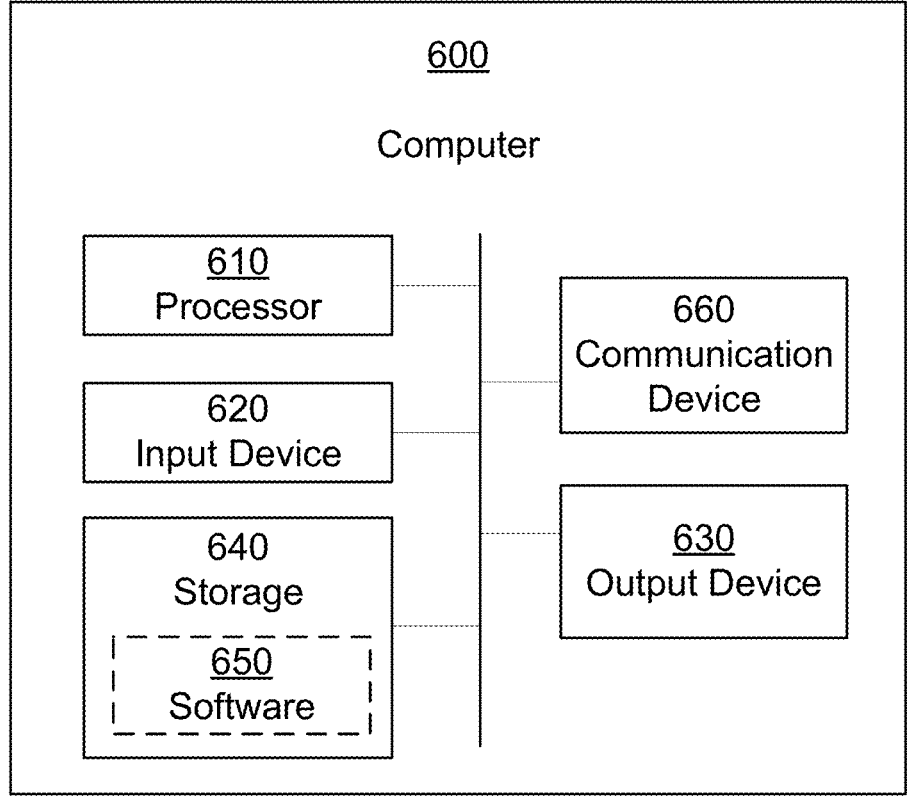
FIG. 6 depicts a computing device in accordance with some embodiments.

The operations described herein, including those described with references to FIGS. 1-5, are optionally implemented by one or more computing systems having components depicted in FIG. 6. It would be clear to a person having ordinary skill in the art how other processes, for example, combinations or sub-combinations of all or part of the operations described above, may be implemented based on the components depicted in FIG. 6. It would also be clear to a person having ordinary skill in the art how the methods, techniques, and systems described herein may be combined with one another, in whole or in part, whether or not those methods, techniques, systems, and/or devices are implemented by and/or provided by the components depicted in FIG. 6.

FIG. 6 depicts a computing device, in accordance with some embodiments. Computer 600 can be a component of a network communication system. In some embodiments, computer 600 may be configured to execute one or more techniques for providing all or part of an MPR network communication system, for example as described herein.

Computer 600 can be a host computer connected to a network. Computer 600 can be a client computer or a server. As shown in FIG. 6, computer 600 can be any suitable type of microprocessor-based device, such as a personal computer, workstation, server, videogame console, or handheld computing device, such as a phone or tablet. The computer can include, for example, one or more of processor 601, input device 602, output device 603, storage 604, and communication device 605. Input device 602 can generally correspond to those described above and can either be connectable or integrated with the computer.

Input device 602 can be any suitable device that provides input, such as a touch screen or monitor, keyboard, mouse, or voice-recognition device. Output device 603 can be any suitable device that provides output, such as a touch screen, monitor, printer, disk drive, or speaker.

Storage 604 can be any suitable device that provides storage, such as an electrical, magnetic, or optical memory, including a RAM, cache, hard drive, CD-ROM drive, tape drive, or removable storage disk. Communication device 605 can include any suitable device capable of transmitting and receiving signals over a network, such as a network interface chip or card. The components of the computer can be connected in any suitable manner, such as via a physical bus or wirelessly. Storage 604 can be a non-transitory computer-readable storage medium comprising one or more programs, which, when executed by one or more processors, such as processor 601, cause the one or more processors to execute methods described herein.

Software 606, which can be stored in storage 604 and executed by processor 601, can include, for example, the programming that embodies the functionality of the present disclosure (e.g., as embodied in the systems, computers, servers, and/or devices as described above). In some embodiments, software 606 can be implemented and executed on a combination of servers such as application servers and database servers.

Software 606, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 604, that can contain or store programming for use by or in connection with an instruction execution system, apparatus, or device.

Software 606 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 600 can implement any operating system suitable for operating the network. Software 606 can be written in any suitable programming language, such as C, C++, Java, or Python. In various embodiments, application software embodying the functionality of the present disclosure can be deployed in different configurations, such as in a client/server arrangement or through a web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. A network communication system comprising a client device, a pre-proxy server, a forward proxy server, a destination server, a nameserver, and a non-transitory computer-readable storage medium storing instructions that, when executed by one or more processors of the system, cause the system to:

transmit, from the client device to the nameserver, a request for a network address of the destination server;

transmit, from the nameserver to the client device, in response to the request for the network address of the destination server, a network address of the pre-proxy server, wherein the network address of the pre-proxy server is different from the network address of the destination server, such that use of a multi-party relay communication pathway is enforced by causing traffic for the destination server that uses the nameserver to be automatically redirected through the multi-party relay communication pathway;

transmit, from the client device to the pre-proxy server, based on the network address of the pre-proxy server, a transmission comprising a request to access a service hosted at the destination server, wherein the transmission comprises data intended for the destination server and identity information identifying the client device;

transmit, from the pre-proxy server to the forward proxy server, in response to receiving the transmission from the client device, a first transmission comprising the data intended for the destination server and instructions for forwarding the data to the destination server, and wherein the first transmission does not include the identity information identifying the client device; and transmit, from the forward proxy server to the destination server, in response to receiving the first transmission from the pre-proxy server, a second transmission comprising the data intended for the destination server.

2. The network communication system of claim 1, wherein the transmission is sent via a first network protocol and the first transmission is sent via a second network protocol.

3. The network communication system of claim 2, wherein the second network protocol is IETF MASQUE.

4. The network communication system of claim 2, wherein the pre-proxy server encrypts the data intended for the destination server before transmitting it to the forward proxy server.

5. The network communication system of claim 1, wherein the request to access the service hosted at the destination server is transmitted, from the client device to the pre-proxy server, in response to the client device requesting a network address of the destination server from a nameserver and receiving instead from the nameserver a network address of the pre-proxy server.

6. The network communication system of claim 5, wherein the client device received the network address of the pre-proxy server from the nameserver via a DNS protocol.

7. The network communication system of claim 5, wherein the client device received the network address of the pre-proxy server from the nameserver via an oblivious protocol.

8. The network communication system of claim 1, wherein the pre-proxy server communicates via the forward proxy server with the destination server using an oblivious protocol to provide one or both of oblivious authentication and oblivious authorization for the client device.

9. The network communication system of claim 1, wherein the service hosted at the destination server comprises a real-time communication service, and wherein the pre-proxy server provides anonymous access for the client device to access the real-time communication service at the destination server.

10. The network communication system of claim 1, wherein the pre-proxy server and the forward-proxy server are controlled by different entities.

11. The network communication system of claim 1, wherein the pre-proxy server and the destination server are controlled by different entities.

12. The network communication system of claim 1, wherein: the pre-proxy server and the destination server are controlled by the same entity; and the pre-proxy server and the destination server is separated from one another using a trusted execution environment.

13. A non-transitory computer-readable storage medium storing instructions that, when executed by one or more processors of a network communication system comprising a client device, a pre-proxy server, a forward proxy server, a destination server, and a nameserver, cause the system to:

transmit, from the client device to the nameserver, a request for a network address of the destination server;

transmit, from the nameserver to the client device, in response to the request for the network address of the destination server, a network address of the pre-proxy server, wherein the network address of the pre-proxy server is different from the network address of the destination server, such that use of a multi-party relay communication pathway is enforced by causing traffic for the destination server that uses the nameserver to be automatically redirected through the multi-party relay communication pathway;

transmit, from the client device to the pre-proxy server, based on the network address of the pre-proxy server, a transmission comprising a request to access a service hosted at the destination server, wherein the transmission comprises data intended for the destination server and identity information identifying the client device;

transmit, from the pre-proxy server to the forward proxy server, in response to receiving the transmission from the client device, a first transmission comprising the data intended for the destination server and instructions for forwarding the data to the destination server, and wherein the first transmission does not include the identity information identifying the client device; and transmit, from the forward proxy server to the destination server, in response to receiving the first transmission from the pre-proxy server, a second transmission comprising the data intended for the destination server.

14. A method, performed by one or more processors of a network communication system comprising a client device, a pre-proxy server, a forward proxy server, a destination server, and a nameserver, the method comprising:

transmitting, from the client device to the nameserver, a request for a network address of the destination server;

transmitting, from the nameserver to the client device, in response to the request for the network address of the destination server, a network address of the pre-proxy server, wherein the network address of the pre-proxy server is different from the network address of the destination server, such that use of a multi-party relay communication pathway is enforced by causing traffic for the destination server that uses the nameserver to be automatically redirected through the multi-party relay communication pathway;

transmitting, from the client device to the pre-proxy server, based on the network address of the pre-proxy server, a transmission comprising a request to access a service hosted at the destination server, wherein the transmission comprises data intended for the destination server and identity information identifying the client device;

transmitting, from the pre-proxy server to the forward proxy server, in response to receiving the transmission from the client device, a first transmission comprising the data intended for the destination server and instructions for forwarding the data to the destination server, and wherein the first transmission does not include the identity information identifying the client device; and transmitting, from the forward proxy server to the destination server, in response to receiving the first transmission from the pre-proxy server, a second transmission comprising the data intended for the destination server.

* * * * *